Figure 1:
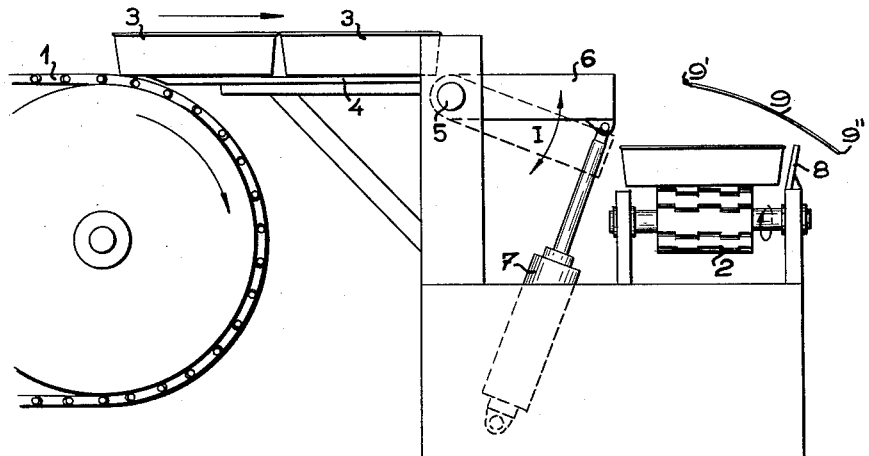

May 17, 1966  W. DE RIDDER  3,251,450
APPARATUS FOR TRANSFERRING BAKERY PANS FROM A DELIVERY
CONVEYOR TO A TRANSVERSE CONVEYOR
Filed April 23, 1964

United States Patent Office 3,251,450
Patented May 17, 1966

3,251,450
APPARATUS FOR TRANSFERRING BAKERY PANS FROM A DELIVERY CONVEYOR TO A TRANSVERSE CONVEYOR
Willem de Ridder, Voorschoten, South Holland, Netherlands
Filed Apr. 23, 1964, Ser. No. 362,054
Claims priority, application Netherlands, Apr. 23, 1963, 291,861
3 Claims. (Cl. 198—27)

This invention relates to apparatus for transferring bakery pans from a delivery conveyor to a transverse conveyor the latter having its conveying surface at a lower level than the delivery conveyor.

A well-known apparatus of this kind is provided with a gliding surface between the adjacent ends of the two conveyors, said gliding surface taking a fixed inclined position. It is a drawback of this well-known apparatus that there is no sufficient guarantee that the pans will be transferred to the transverse conveyor in the right positions. It has been found that, when the pans are initially put on the delivery conveyor—properly positioned— which will be the case when the delivery conveyor is the unloading conveyor of an automatic oven—the pans may take an oblique position with respect to the conveying direction when they are sliding on the inclined gliding surface. In this gliding surface the pans may readily perform turning movements as a result of their bottom surfaces being not completely flat and having no uniform smoothness.

It is the main object of this invention to overcome the above mentioned drawback of the well-known article-transferring apparatus.

Apparatus constructed in accordance with the invention is provided with a gliding surface between the two conveyors, pivoted adjacent the delivery conveyor so as to rock about a horizontal axis between a substantially horizontal position and a position in which it slopes downwardly towards the transverse conveyor.

With the apparatus so constructed the pans—which are usually united in sets of four or more—may be initially moved onto the glide surface when the latter is still in its horizontal position. As this movement is a positive forced displacement which e.g. may be effected by the propelling action of the following (rows of) pan sets or by means of reciprocating pusher bars no disalignment can occur. The distance towards the transverse conveyor which has still to be covered by the pans along the glide surface when the latter is moved into its slanting position is relatively small, so that also during this final transferring phase no appreciable turning of the pans can occur. Besides the overall length of the rockable glide surface of the present invention may be substantially shorter than the fixed glide surface of the well-known apparatus, as in case of a fixed glide a relatively long transitional surface area will be required in order to avoid tilting of the pans at the bend between the horizontal delivery surface and the slanting glide surface, which transitional area increases the risk of undesired turning movements of the pans.

Although the glide surface could be mounted so that, when moving downwardly, its end away from the transverse conveyor would be lifted above the conveying surface of the delivery conveyor and might serve as an aligning abutment for the next set(s) of pans, it is still preferred to provide the rocking axis closely adjacent said end and so that no part of the glide surface will rise above the delivery surface on which the pans are supplied.

When in that case the glide surface is tilting downwardly the next set of pans may already move past the rocking axis so that movement of this set of pans need not be interrupted until the glide surface has returned to its horizontal position.

In case of failure of the drive of the transverse conveyor or stagnation of the discharge from the transverse conveyor it is desired that further sets of pans be not delivered to the transverse conveyor but to some other place.

In a preferred embodiment of the present apparatus this is possible on account of the presence of an auxiliary glide surface extending across the transverse conveyor, the upper end of said auxiliary glide surface being positioned in conjunction with the rockable main glide surface when the latter is in its horizontal position. In case of emergency the main glide surface may be kept in its horizontal position—automatically if desired—in order to discharge the following sets of pans along the auxiliary glide surface beyond the transverse conveyor, e.g. onto an auxiliary conveyor disposed beside the transverse conveyor. In this way stagnation of the delivery from the oven and from the main conveyor is avoided.

Figure 2:
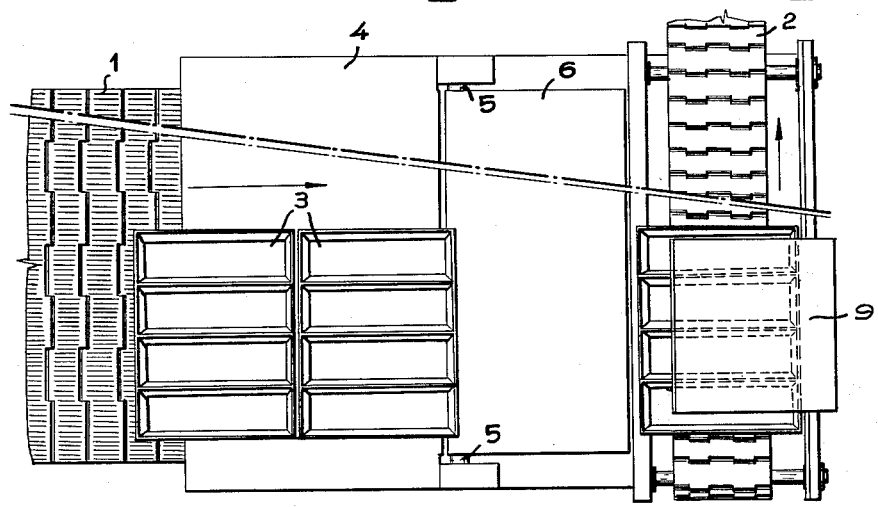

Other objects and advantages of the invention will become apparent from the following description of a preferred embodiment of the present apparatus with reference to the accompanying drawings in which:

FIG. 1 is a diagrammatic side elevation of apparatus constructed in accordance with the invention, and FIG. 2 is a top plan view of the apparatus shown in FIG. 1.

With reference to the drawings 1 indicates the delivery end of a main or delivery conveyor, leading from an oven or other machine (not shown) to a transverse conveyor 2, the latter having its conveying surface at a lower level than the main conveyor 1. The bread loaf pans 3, which are united into sets or "couples" in the usual manner, are to be transferred to the transverse conveyor correctly, i.e. without the position of the pans relatively to the conveying direction being changed. For this purpose the pan sets are initially moved from the conveyor 1 onto the horizontal plate 4, from which the pan sets or rows of pan sets are successively taken up by a glide plate 6 which is mounted for rocking movement about a horizontal axis 5 extending perpendicular to the direction of delivery.

An actuating device 7, which is pivotally connected with the main frame and which may be controlled either pneumatically, hydraulically or electrically, acts on the glide plate 6 so as to rock it continuously (vide double-pointed arrow I) between the substantially horizontal position, shown by full lines in the drawings and an inclined position (shown by dotted lines in FIG. 1) in which the glide plate stops downwardly towards the transverse conveyor 2.

The actuation of the glide plate 6 is so adjusted and controlled with respect to the rate of supply of the pan sets by the main conveyor 1 that, at the moment when the glide plate has practically returned from its inclined position back into its horizontal position, the next pan set or row of pan sets has already moved past the rocking axis 5 such a distance that the centre of gravity of the pan set is still located to the left of the axis 5. In the following short period of time, during which the glide plate is moving further into its horizontal position and may stay in this position for a while if desired, the pan set or row of pan sets in question slide further onto the glide plate so that they may glide downwardly towards and onto the transverse conveyor when the glide plate is moved into its inclined position again.

8 indicates an abutment rail positioned along the side of the transverse conveyor remote from the delivery conveyor, which rail prevents the pan sets from moving too far across the transverse conveyor.

9 indicates an auxiliary glide plate which enables the pan sets delivered by the conveyor 1 to be discharged beyond the transverse conveyor when the discharge of the pans from the latter would become stagnated for some reason.

In the embodiment shown the auxiliary glide plate extends across the transverse conveyor 2 and its upper end 9' is positioned in conjunction with the main glide plate 6, when the latter is in its horizontal position. The lower end 9" of the glide plate 9 e.g. leads to an auxiliary conveyor (not shown) disposed beside the transverse conveyor 2. When one is forced—e.g. in case of the above mentioned failures or stagnations—to discharge the pans, supplied by the main conveyor, the main glide plate 6 is arrested in its horizontal position, so that the pans may slide from the plate 6 onto the plate 9 etc. If desired the arresting of the glide plate 6 in its horizontal position may take place automatically when any stagnating circumstance occurs.

The disclosed embodiment of the invention is representative of a presently preferred form of the invention but is intended to be illustrative rather than definitive thereof. The invention is defined in the claims.

I claim:
1. Apparatus for transferring sets of bakery pans from a main conveyor onto a transverse conveyor having its conveying surface at a lower level than the main conveyor while maintaining the alignment of the bakery pans comprising, in combination, a dump chute for the bakery pans, forming a continuation of the main conveyor, which is mounted to pivot about a transverse axis adjacent to the receiving end of the chute, between a position which is substantially level with the main conveyor and a position which is inclined downwardly toward the transverse conveyor at such an angle as to cause the bakery pans to slide rapidly down the chute, and an actuating mechanism which oscillates the chute between such two positions, and which operates in synchronism with the movement of the bakery pans on the main conveyor to cause the chute to approach its substantially level position as the center of gravity of each set of bakery pans approaches a vertical plane passing through the pivotal axis of the chute and to cause the chute to move toward its inclined position after the set of pans is in position to slide down the chute.

2. Apparatus according to claim 1 comprising a stationary substantially horizontal glide surface connecting the main conveyor with the dump chute.

3. Apparatus according to claim 1 comprising an auxiliary stationary chute extending over the transverse conveyor and having its upper end in substantial horizontal alignment with the level position of the dump chute, to receive the bakery pans when the dump chute is arrested in its level position.

References Cited by the Examiner

UNITED STATES PATENTS

| | | | |
|---|---|---|---|
| 2,709,013 | 5/1955 | Hartzog | 198—26 X |
| 2,888,126 | 5/1959 | Leaman et al. | 198—27 |
| 3,036,690 | 5/1962 | Kirchhofer | 198—20 |
| 3,056,482 | 10/1962 | Lanham et al. | 198—26 X |

EVON C. BLUNK, *Primary Examiner.*

SAMUEL F. COLEMAN, *Examiner.*

R. E. KRISHER, *Assistant Examiner.*